(12) United States Patent
Mitby et al.

(10) Patent No.: US 7,215,144 B2
(45) Date of Patent: May 8, 2007

(54) PRE-EMPHASIS DRIVER WITH CONSTANT IMPEDANCE

(75) Inventors: John Steven Mitby, Rochester, MN (US); David W. Siljenberg, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 10/849,584

(22) Filed: May 20, 2004

(65) Prior Publication Data

US 2005/0258870 A1    Nov. 24, 2005

(51) Int. Cl.
*H03K 19/0175* (2006.01)
*H03K 19/094* (2006.01)

(52) U.S. Cl. .................... 326/82; 326/30; 326/83; 326/86; 326/87

(58) Field of Classification Search ............ 326/82–83, 326/86–87, 90, 30; 327/108, 112, 39–49
See application file for complete search history.

(56) References Cited

U.S. PATENT DOCUMENTS

| | | | |
|---|---|---|---|
| 3,646,480 A * | 2/1972 | Spaulding .................... 333/18 |
| 6,114,885 A | 9/2000 | Yang et al. |
| 6,222,389 B1 * | 4/2001 | Williams ...................... 326/86 |
| 6,310,496 B1 * | 10/2001 | Nomura ....................... 326/87 |
| 6,407,609 B1 * | 6/2002 | Aggarwal et al. .......... 327/317 |
| 6,437,610 B1 * | 8/2002 | Schrodinger ................ 327/108 |
| 6,452,428 B1 * | 9/2002 | Mooney et al. ............. 327/108 |
| 6,624,659 B1 * | 9/2003 | Abraham et al. ............. 326/82 |
| 6,690,196 B1 | 2/2004 | Cecchi et al. |
| 6,734,700 B2 * | 5/2004 | Chiu et al. .................... 326/27 |
| 6,772,250 B2 * | 8/2004 | Dreps et al. ................. 710/100 |
| 6,999,540 B2 * | 2/2006 | Cranford, Jr. ............... 375/350 |
| 2002/0118042 A1 * | 8/2002 | Helt et al. ..................... 326/86 |

\* cited by examiner

*Primary Examiner*—Rexford Barnie
*Assistant Examiner*—Jason Crawford
(74) *Attorney, Agent, or Firm*—Robert R. Williams

(57) ABSTRACT

An apparatus and method is disclosed for transmitting signals over a signal conductor using a precompensated driver that does not use a current source, and which drives the signal conductor with an impedance similar to the characteristic impedance of the signal conductor. Since no current source is used, the precompensated driver can operate at very low supply voltage.

20 Claims, 7 Drawing Sheets

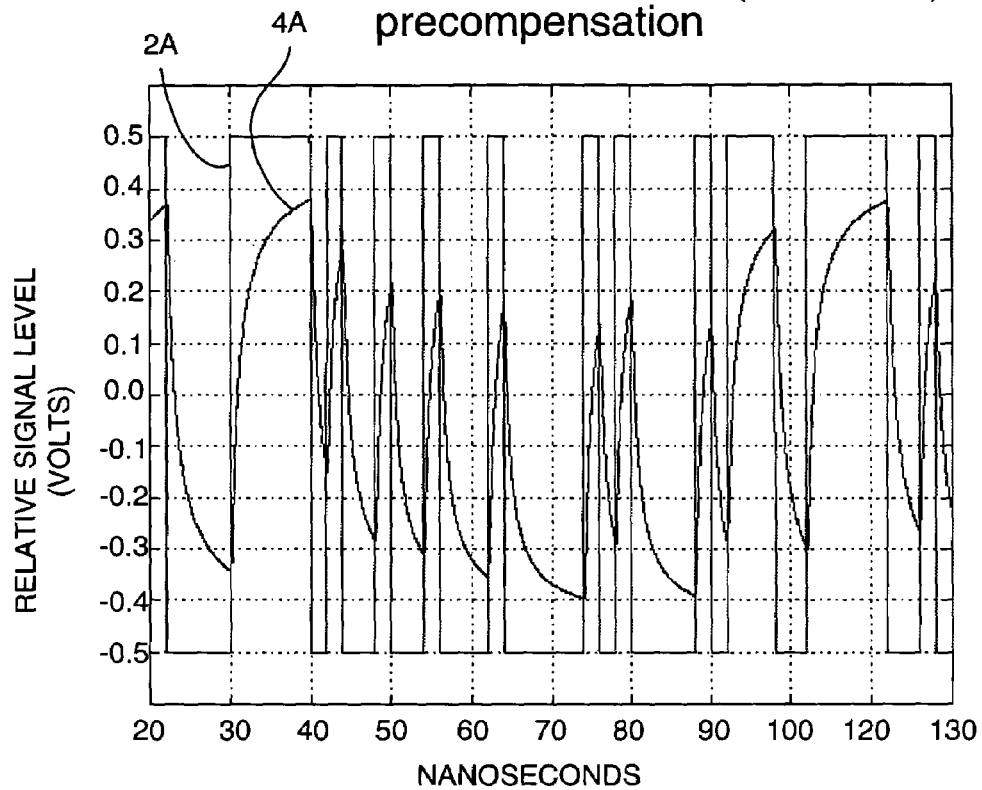
Fig. 1A No precompensation (PRIOR ART)
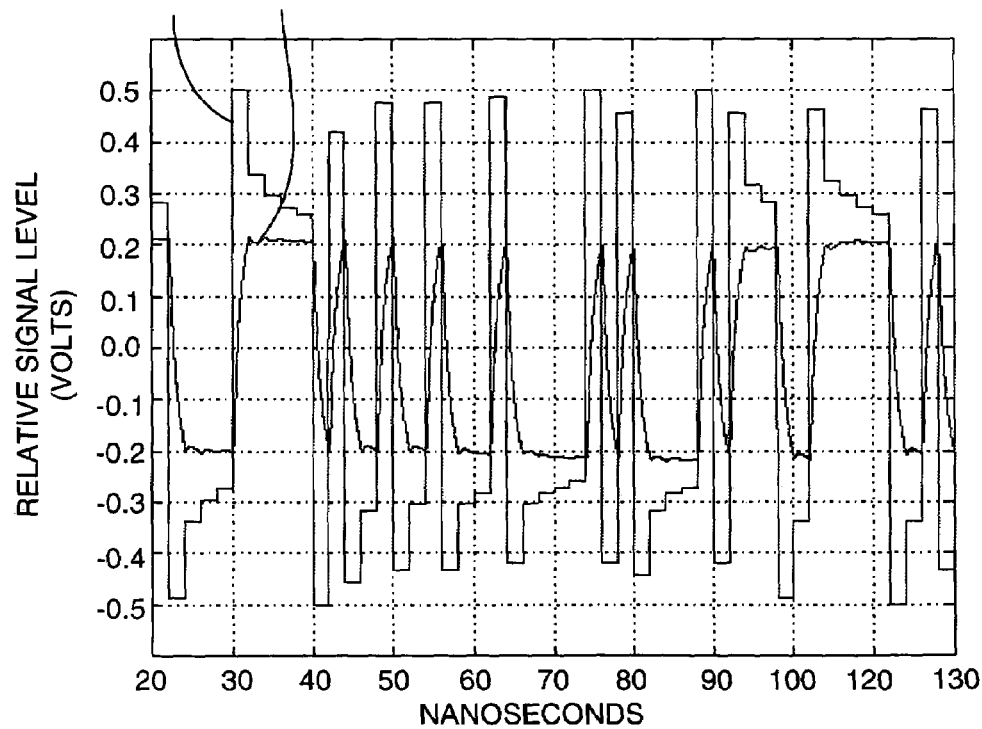
Fig. 1B precompensation (PRIOR ART)

PRE-EMPHASIS DRIVER WITH CONSTANT IMPEDANCE

BACKGROUND OF THE INVENTION

1. Field of the Invention

The current invention generally relates to semiconductor products. More specifically, the current invention relates to high speed precompensated drivers

2. Description of the Related Art

Components in electronic systems are generally interconnected by signal conductors, also known as transmission lines, which carry information sent from a first semiconductor chip to a second semiconductor chip. Such signal conductors are generally characterized by their inductance per unit length, capacitance per unit length, and attenuation per unit length. Skin effect attenuation on such signal conductors will distort a transmitted signal. This attenuation is frequency dependent and affects both the amplitude and phase of the transmitted signal. The skin effect attenuation reshapes data pulses in the transmitted signal and smears the signal in time so that adjacent bits overlap and interfere at a receiving end of the signal conductor. The arrival time of each bit in the transmitted signal becomes dependent on a preceding bit pattern. This is referred to as ISI (intersymbol interference) or pattern dependent jitter. ISI becomes very pronounced with long signal conductors and high frequency data streams.

Precompensation, also known as transmitter equalization, can be used to reduce ISI due to the effects of attenuation on the signal conductor. A high pass filter cascaded with the cable will equalize the frequency response of the signal conductor and reduce distortion on the transmitted signal. With precompensation the equalizing high pass filter is implemented as a digital filter combined with an output driver that drives the transmitted signal onto a proximal end of the signal conductor.

FIG. 1A illustrates the ISI on an unequalized signal conductor; FIG. 1B illustrates how ISI can be dramatically improved with precompensation. In FIG. 1A, signal 2A is the signal driven at the proximal end of the signal conductor and signal 4A is the signal as received at a distal end of the signal conductor. Note that, in FIG. 1A, the output driver always drives the same voltages (+0.5 uplevel, −0.5 downlevel, as the "relative signal level" in FIG. 1A). Signal 4A reaches a much higher voltage at the distal end of the signal conductor when a positive relative signal level is driven for a relatively long time. It is apparent from inspection of FIG. 1A that arrival time of a particular pulse is very dependent upon the preceding pattern of pulses. It is doubtful that signal 4B can be reliably received at all, since, as shown at approximately 42 nsec, a brief negative pulse following a long pulse barely falls under a relative signal level of zero, which is the switching threshold of a receiver at the distal end of the signal conductor. FIG. 1B shows how a relatively sophisticated precompensation scheme can make pulses transmitted at the proximal end of the signal conductor arrive at the distal end of the signal conductor at predictable times and with similar amplitudes. The output driver drives signal 2B at the proximal end of the signal conductor. It will be noted that, depending on a prior pattern of switching, the output driver drives the proximal end of the signal conductor with different amplitudes at different times determined by a digital filter that implements the equalizing high pass filter.

The signal conductor has a frequency response, or transfer function, $H_{sc}$; the digital filter has a frequency response, or transfer function, of $H_{df}$. The overall frequency response (transfer function) of the digital filter and the signal conductor is $H_{overall} = H_{sc} H_{df}$. If $H_{df} = 1/H_{sc}$ the overall response is undistorted. In practice, the digital filter in a particular precompensated driver design is only an approximation of the ideal, and considers only a small history of preceding patterns. The embodiment of a practical digital filter is typically limited by the designer for economic reasons in the number of voltage levels that can be driven and the duration that each voltage level is driven.

A previous design of a precompensated driver, U.S. Pat. No. 6,690,196, by Cecchi, et al, teaches a simultaneous bi-directional I/O system comprising precompensated output drivers. The output stage in this patent switches on one or more CMOS current sources of values suitable to transmit signals down a signal conductor according to the digital filter design.

Current sources, such as those described in U.S. Pat. No. 6,690,196 require sufficient voltage supplied to the driver output to operate. Voltage supplies applied to modern semiconductor technologies have been of decreasing voltage for many years, and the trend to drop the voltage of the supply voltage even further is strongly motivated by increasingly thin oxides and FET (field effect transistor) channel lengths. Therefore, use of current sources in the output stage is becoming increasingly difficult. Another drawback of current sources is their high output impedance. Although high speed systems typically are designed with termination of similar impedance to a characteristic impedance of the signal conductor, as determined by the inductance per unit length and capacitance per unit length, such terminators take up area on the semiconductor chips.

Therefore, there is a need for a precompensated driver that embodies a precompensated driver transfer function that does not require current sources in the output stage, and provides proper termination in the output stage.

SUMMARY OF THE INVENTION

The current invention teaches methods and apparatus to transmit signals over a signal conductor using a precompensated driver that does not use a current source in the output stage, and which drives the signal conductor with an impedance similar to the characteristic impedance of the signal conductor.

In a method embodiment of the driver, switches coupled to a plurality of resistors are controlled in such a way as to provide Thevenized voltages suitable to implement a precompensated driver transfer function, while providing Thevenized output impedance suitable to match the characteristic impedance of the signal conductor. In various embodiments, the switches can be N-channel FETs (NFETs), P-channel FETs (PFETs), PNP bipolar transistors, NPN bipolar transistors, or any other suitable switching elements. Thevenin's theorem, commonly taught in undergraduate electrical, electronics, or physics classes, teaches that any two terminal networks can be replaced with a Thevenized voltage supply in series with a Thevenized impedance. In more detail, Thevenin's theorem is a procedure that helps us represent any resistive circuit by redrawing it into a standardized configuration. The Thevenin standard configuration consists of an equivalent series resistance (Rth) to the load, called the Thevenin resistance, and an equivalent voltage source (Vth) called the Thevenin voltage. Keep in mind that Thevenin's theorem is especially important when the circuit's load resistance will be changing often. Once the original circuit is "Thevenized" new values of load voltage and current as a result of load resistance changes can be very quickly and easily recalculated. The basic steps to Thevenize a circuit is as follows:

Step #1. Remove the load.

Step #2. Determine the voltage between the terminals to which the load was connected. This is the Thevenin voltage (Vth).

Step #3. Short the voltage source (replace voltage source with a wire).

Step #4. Determine the resistance across the terminals to which the load was connected. This is the Thevenin resistance (Rth).

In an apparatus embodiment, a precompensated driver implements a precompensated transfer function without the use of a current source, allowing operation of the precompensated driver with a very low supply voltage.

In an apparatus embodiment of a precompensated driver according to the invention, a plurality of pullup resistors each have a first end coupled to a driver output and a second end of each pullup resistor coupled to a pullup switch dedicated to that pullup resistor. A plurality of pulldown resistors each have a first end coupled to the driver output and a second end of each pulldown resistor coupled to a pulldown switch dedicated to that pulldown resistor. The switches are controllable by a predriver such that Thevenized voltages are provided according to the design of a digital filter, and further such that Thevenized output impedance is suitable to match the characteristic impedance of a signal conductor driven by the precompensated driver.

BRIEF DESCRIPTION OF THE DRAWINGS

FIG. 1A is a prior art drawing that shows waveforms at a driver end of a signal conductor and at a distal receiver end, as driven by a driver that is not precompensated.

FIG. 1B is a prior art drawing that shows waveforms at a driver end of a signal conductor and at a distal receiver end, as driven by a driver that is precompensated.

DETAILED DESCRIPTION OF THE PREFERRED EMBODIMENTS

The invention will be described in detail with reference to the figures. It will be appreciated that this description and these figures are for illustrative purposes only, and are not intended to limit the scope of the invention. In particular, various descriptions and illustrations of the applicability, use, and advantages of the invention are exemplary only, and do not define the scope of the invention. Accordingly, all questions of scope must be resolved only from claims set forth elsewhere in this disclosure.

The current invention teaches methods and apparatus to transmit signals over a signal conductor using a precompensated driver that does not use a current source in the output stage, and which drives the signal conductor with an impedance similar to the characteristic impedance of the signal conductor.

FIGS. 1A and 1B were described earlier to review the need for precompensation, and how precompensation can implement a transfer function that corrects for attenuation in the signal conductor.

Figure 2:
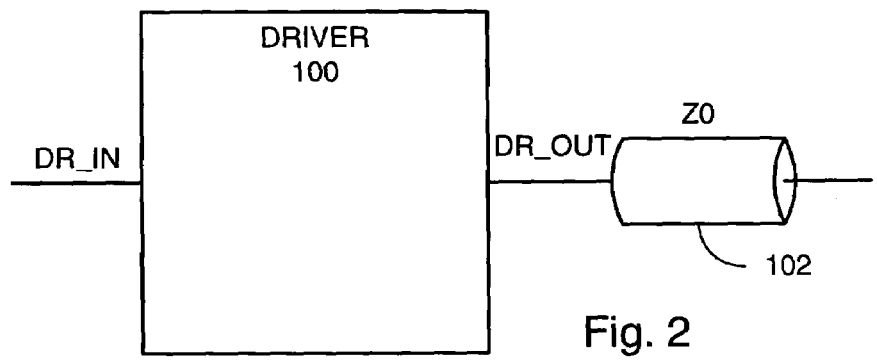
FIG. 2 shows a precompensated driver having an input and an output coupled to a signal conductor.

FIG. 2 shows a precompensated driver 100 having an input, DR-IN, and an output, DR_OUT. Output DR_OUT is coupled to a signal conductor 102. Signal conductor 102 is a transmission line characterized electrically by a characteristic impedance, Z0. Signal conductor 102 also has frequency dependent attenuation characteristics for which the precompensation is needed to accommodate for reliable, high-speed, transmission of data from the precompensated driver to a receiver (not shown) at a distal end of signal conductor 102.

Figure 3A:
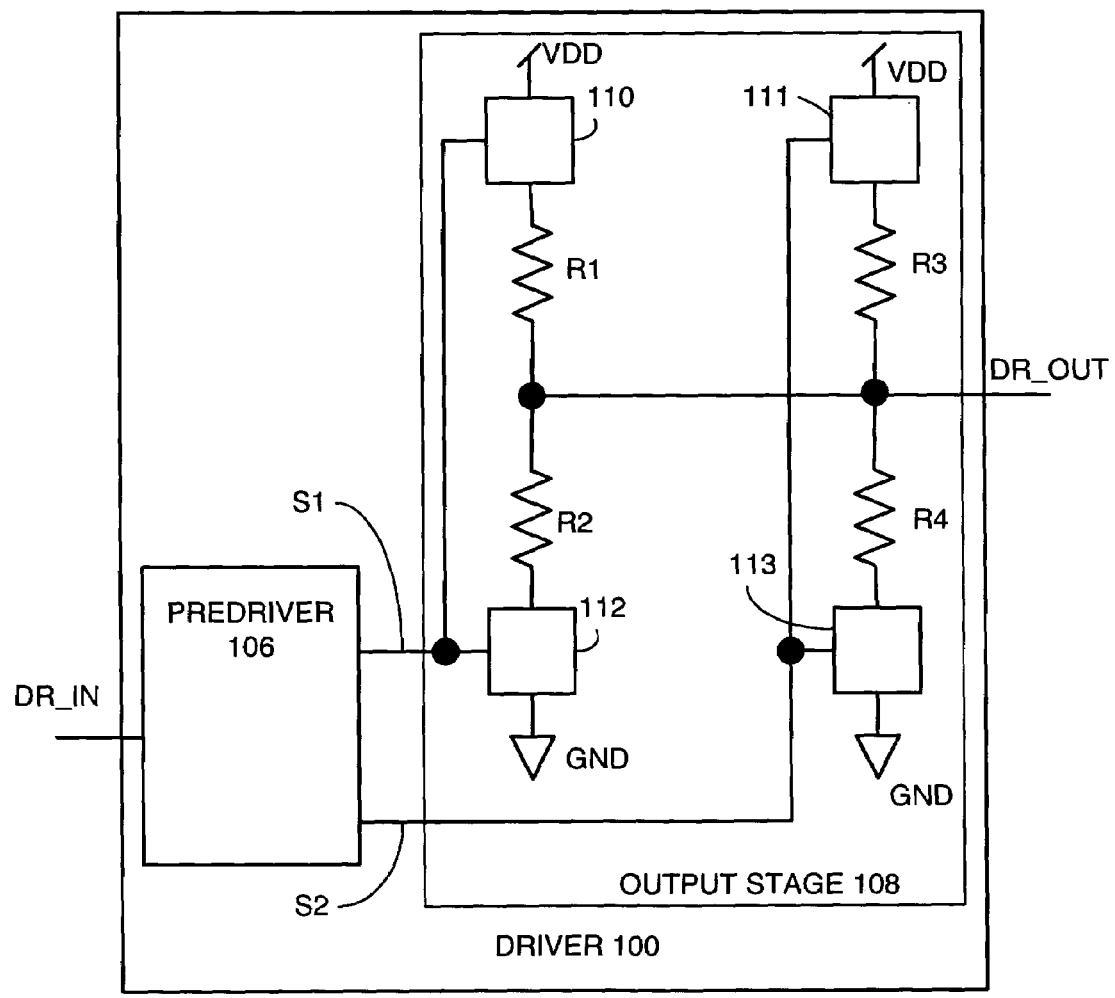
FIG. 3A shows more detail of the precompensated driver of FIG. 2, including a predriver and an output stage having switches and resistors.

FIG. 3A shows that driver 100 has a predriver 106 and an output stage 108, which, together, implement a particular digital filter according to the precompensation transfer function desired. For simplicity, only a simple precompensation transfer function is illustrated, providing two possible uplevel voltages, and two downlevel voltages. It will be understood by those skilled in the art that any number of uplevel voltages and any number of downlevel voltages are within the spirit and scope of the invention.

Output stage 108 has two pullup resistors, R1 and R3. A first end of each of the pullup resistors R1 and R3 is coupled to DR_OUT. A second end of R1 is coupled to switch 110. Switch 110, under control of signal S1 connects or disconnects the second end of R1 to a first supply voltage VDD. Similarly, switch 111, under control of signal S2 connects or disconnects a second end of R3 to VDD. Pulldown resistors R2 and R4 each have a first end coupled to DR_OUT. Switches 112 and 113, respectively, connect or disconnect second ends of pulldown resistors R2 and R4 to a second supply voltage, GND.

Figure 3B:
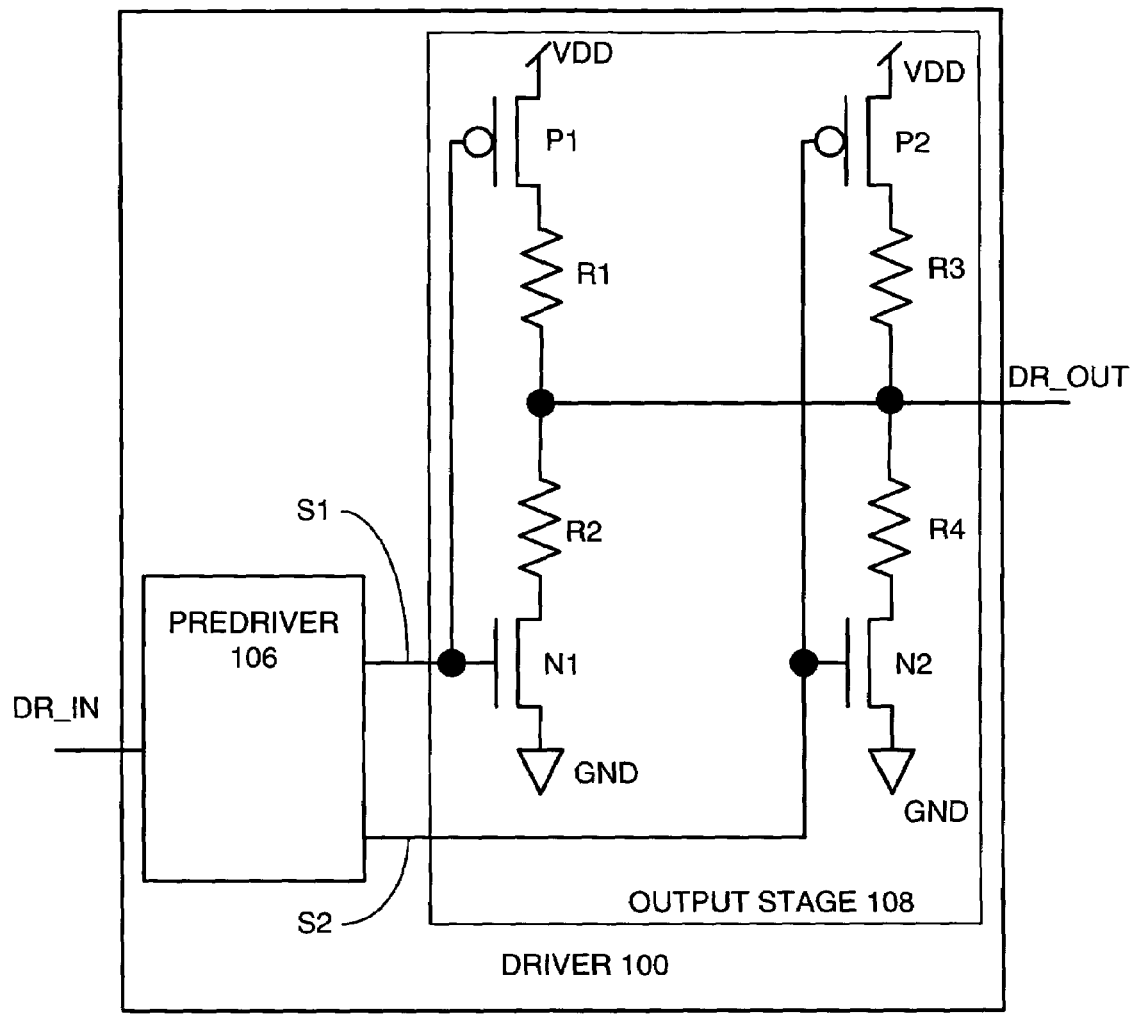
FIG. 3B shows more detail of the precompensated driver of FIG. 3A, including a predriver and an output stage, the output stage having FETs as the switches, and resistors.

FIG. 3B is shown as a more concrete example of driver 100, in which PFET P1 is used as switch 110; PFET P2 is used as switch 111; NFET N1 is used as switch 112; and NFET N2 is used as switch 113. Those skilled in the art will understand that bipolar transistors could also be used to perform the switching function of switches 110–113. For simplicity, PFETs P1 and P2, and NFETs N1 and N2 are assumed to have zero resistance. It is understood that in practice, when turned on, the FETs will have some amount of resistance. When turned on, the FETs will be in a linear region of the FET operation, and the FETs will be designed to be large enough (i.e., a large width to length ratio) as to be relatively small resistance compared to their series resistor.

R1, R2, R3, and R4 are designed such that, for any values of S1 and S2, the Thevenin impedance of driver 100 at DR_OUT matches a predetermined impedance to match a particular Z0 of signal conductor 102, while at the same time, producing Thevenized voltages at DR_OUT that embody the desired transfer function.

For example, if signal conductor 102 has a characteristic impedance of 50 ohms, and the driver must drive a voltage equal to VDD as a first Thevenized voltage, and 0.83 VDD as a second Thevenized voltage (and similar ratio for a downlevel), R1 and R2 are 60 ohms; R3 and R4 are 300 ohms. Thus, when S1 and S2 are "low", P1 and P2 conduct; N1 and N2 are off. The parallel combination of R1 and R3 is 50 ohms. The Thevenized voltage is VDD. When S1 and S2 are both "high", N1 and N2 are on, and P1 and P2 are off. The Thevenized impedance is determined by the parallel combination of R2 and R4 (i.e., 50 ohms), and the Thevenized voltage is GND. When S1 is "low" and S2 is "high", P1 and N2 are on; P2 and N1 are off. The Thevenized impedance is the parallel combination of R1 and R4, which is 50 ohms. The Thevenized voltage (VDD*300/(300+60)) is 0.83*VDD. When S1 is "high" and S2 is "low", the Thevenized impedance is the parallel combination of R2 and R3, which is 50 ohms. The Thevenized voltage (VDD*60/(300+60)) is 0.17*VDD.

In general, where "||" means "the parallel combination of", the equations that must be satisfied are:

$R1 \| R3 = Z0$ (Z0 is the characteristic impedance of signal conductor 102)     (1)

$R2 \| R4 = Z0$     (2)

$R1 \| R4 = Z0$     (3)

$R2 \| R3 = Z0$     (4)

$VDD * R4/(R1+R4) = X * VDD$     (5)

(where X is a fraction determined by the desired transfer function)

$VDD * R2/(R2+R3) = (1-X) * VDD$     (6)

Note that, the above six equations assume that the maximum Thevenin voltage output by the precompensated driver is VDD, and that the minimum Thevenin voltage output by the precompensated driver is GND (i.e., zero volts). The invention contemplates the more complicated case where a maximum voltage less than VDD, or a minimum voltage greater than GND is implemented, and equations similar to the above would be needed to compute the appropriate Thevenized voltages.

It will be understood that, for simplicity, the exemplary precompensated driver 100 is shown having two signals (S1 and S2) controlling switches (110, 112, and 111, 113, respectively), any number of such signals are contemplated, and any number of controlling switches are contemplated, with corresponding additional equations similar to (1)–(6) above needing to be satisfied.

Output stage 108 requires no current source, and therefore is suitable for operation at very low values of VDD. The actual minimum value of VDD usable is dependent on the type of switches used for switches 110–113. If FETs (field effect transistors) are used as shown in FIG. 3B, and if predriver 106 provides signals S1 and S2 with an uplevel of VDD and a downlevel of GND (i.e., the same as output stage 108), sufficient VDD is required to put FETs (PFETs P1, P2, and NFETs N1, N2) into a linear region of operation when turned on, that is, VDD must exceed a threshold voltage by enough margin to ensure linear operation. Linear operation occurs when a gate to source voltage (VGS) exceeds a drain to source voltage (VDS) minus an FET threshold voltage (VT). The FETs are advantageously designed to be of large enough width/length ratio so as to be of low resistance relative to the series resistor; therefore most of the voltage drop is across the resistor. Therefore, output stage 108 can operate properly with VDD only slightly above GND plus one VT, for example, 100 millivolts above one VT. Output stage, for example, easily performs when VDD is two VT's above GND.

In an embodiment, predriver 106 drives S1 and S2 with an uplevel voltage sufficiently above VDD, and a downlevel voltage sufficiently below GND as to allow linear operation of FETs P1, P2, N1, N2, allowing operation of output stage 108 with an extremely small VDD voltage, for example 0.1 volts.

Figure 4:
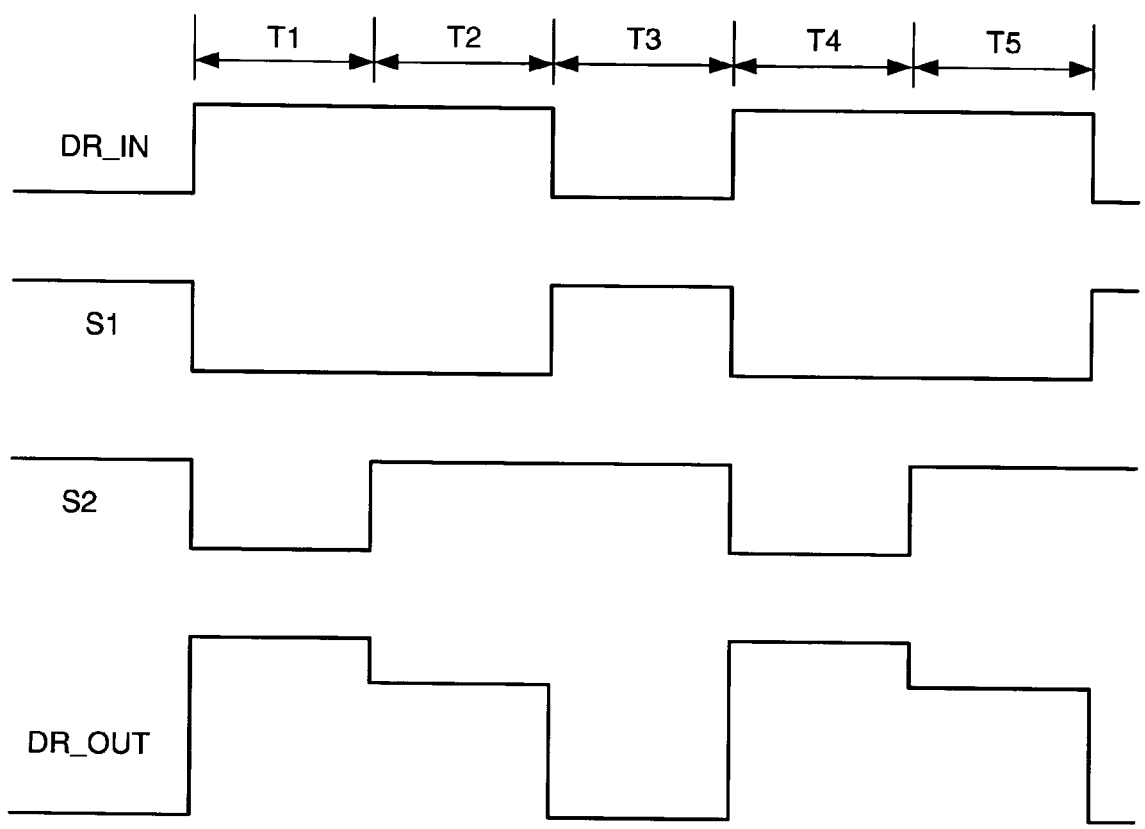
FIG. 4 shows exemplary waveforms at nodes in FIGS. 3A and 3B.

FIG. 4. shows exemplary waveforms of DR-IN, S1, S2, and DR_OUT as shown in FIGS. 3A and 3B. DR_IN goes "high" for two time periods, T1 and T2, then falls to a "low" for a single time period T3, then again goes "high" for T4 and T5. S1 and S2 are both driven "low" for T1, causing output stage 108 to go to its maximum Thevenized voltage. During T2, S2 is driven high, turning off switch 111 and turning on switch 113 (FIG. 3). As described earlier, output stage 108 will fall to a lower Thevenized voltage level, thereby executing the transfer function as described earlier. It will be understood that the voltage at DR_OUT when precompensated driver 100 is coupled to signal conductor 102 is determined by the Thevenin voltage of output stage 108, the output impedance of output stage 108, and the characteristic impedance of signal conductor 102. At T3, DR_IN falls. S1 rises and S2 stays "high", causing switches 112 and 113 to be on, and switches 110 and 111 to be off, causing output stage 108 to fall to its minimum Thevenized voltage. In the example shown, the process repeats starting with time T4.

Figure 5A:
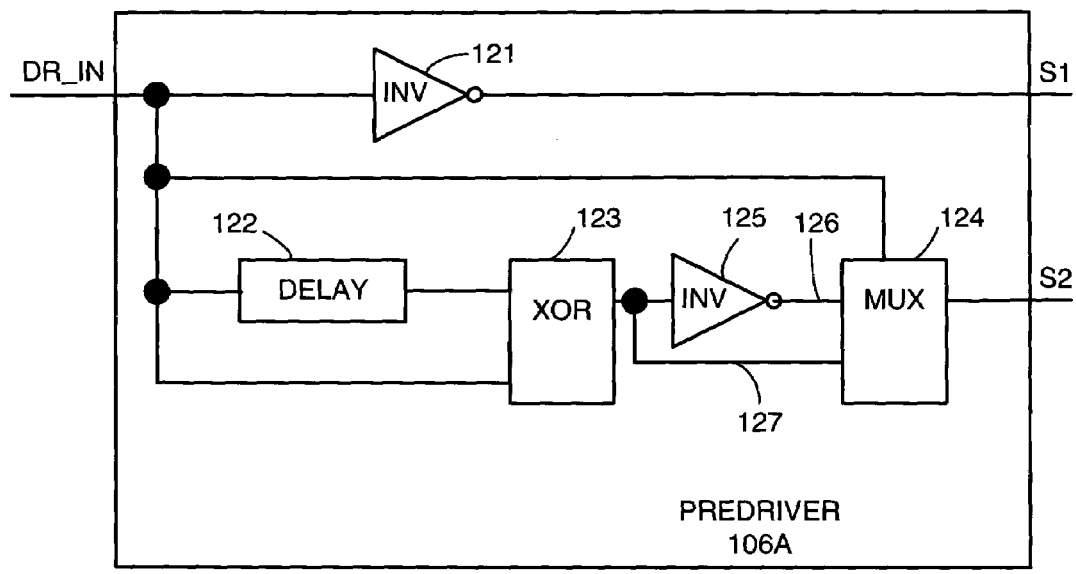
FIGS. 5A and 5B each show an embodiment of a predriver suitable for use in the precompensated driver of FIGS. 3A and 3B.
Figure 5B:
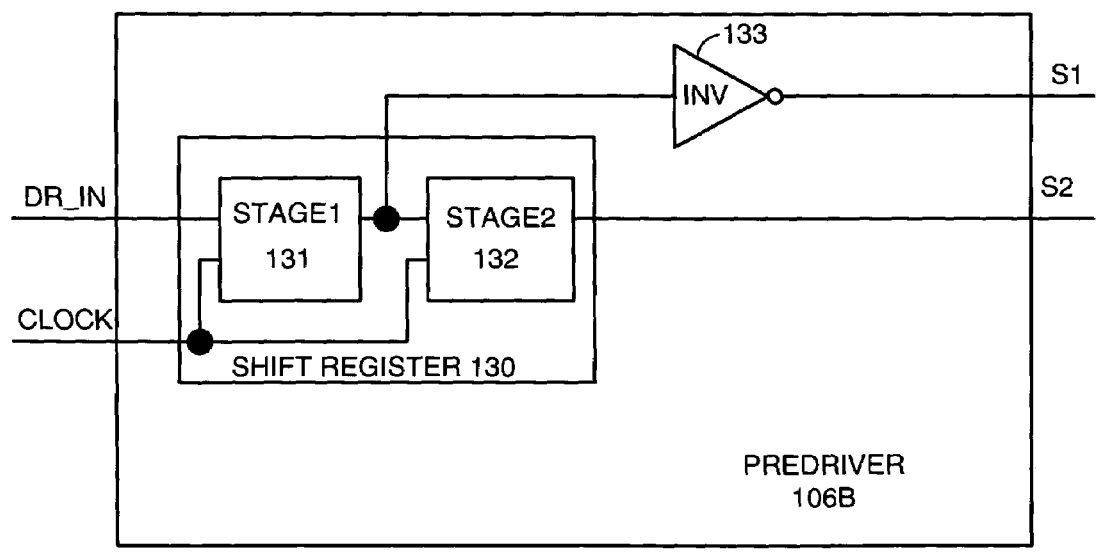

FIGS. 5A and 5B show two exemplary embodiments of predriver 106, designated 106A and 106B. Both predrivers 106A and 106B receive DR_IN and produce signals S1 and S2. Predriver 5A relies on delay 122, XOR 123, INV 125, and MUX 124 to produce signal S2. S2, as noted from FIG. 4, is a pulse of appropriate direction of length suitable to augment the signal controlled by signal S1. For example, in FIG. 5A, when DR_IN rises (e.g., at T1), signal 127 rises in response to the transition of DR_IN at a first input of XOR 123, and signal 127 remains "high" until delay 122 provides the transition to a second input of XOR 123, at which time signal 127 falls. Signal 126 is the same as signal 127, but with opposite phase. DR_IN is further coupled to MUX 124, which selects signal 126 when DR_IN is "high", thereby coupling a negative-going pulse on S2 of duration determined by delay 122. (Note that delays and rise/fall differences in XOR 123, INV 125, and MUX 124 are being ignored for simplicity). The negative-going pulse on signal S2 responsive to the rise of DR_IN at the beginning of T1 is as shown in FIG. 4 at T1. If the value of delay 122 is longer than the duration of T1, the negative going pulse on S2 will be longer than T1; if the value of delay 122 is shorter than the duration of T1, the negative going pulse on S2 will be shorter than T1. Operation for negative-going transitions on DR_IN will operate similarly, with the "low" value on DR_IN gating signal 127 through MUX 124 to signal S2.

Predriver 106B, shown in FIG. 5B, generates control signals S1 and S2 using a two stage shift register 130, having a stage1 131 and a stage2 132. A clock is provided, having a period equal to, for example, the time intervals T1 (and T2–T5) shown in FIG. 4. Continuing the example of FIG. 4, the value of DR_IN is coupled to signal S1 (via stage1 131 and INV 133) responsive to an edge of the clock. Stage2 132 provides a one clock delayed replica of the waveform of DR_IN, as seen in FIG. 4. Additional stages in shift register 130 are contemplated, in order to implement a more complex transfer function having more signals controlling more switches.

Figure 6:
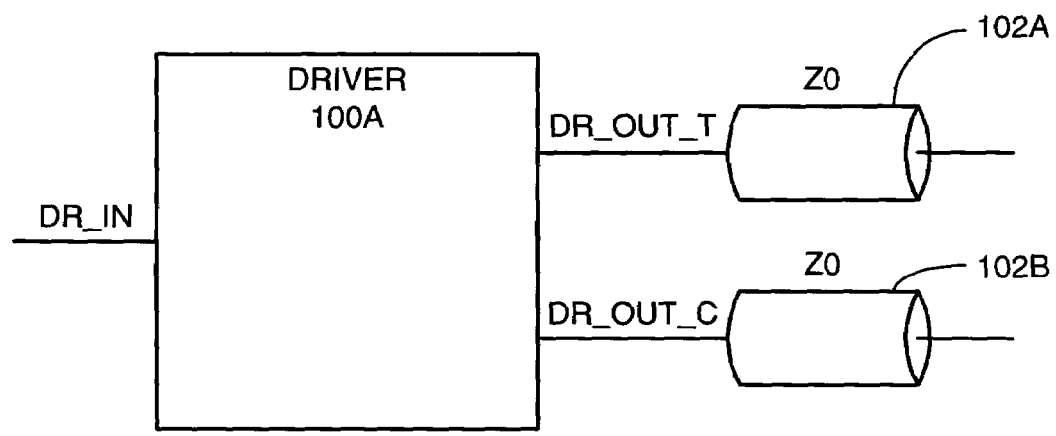
FIG. 6 shows a precompensated driver suitable for driving a differential signal.
Figure 7:
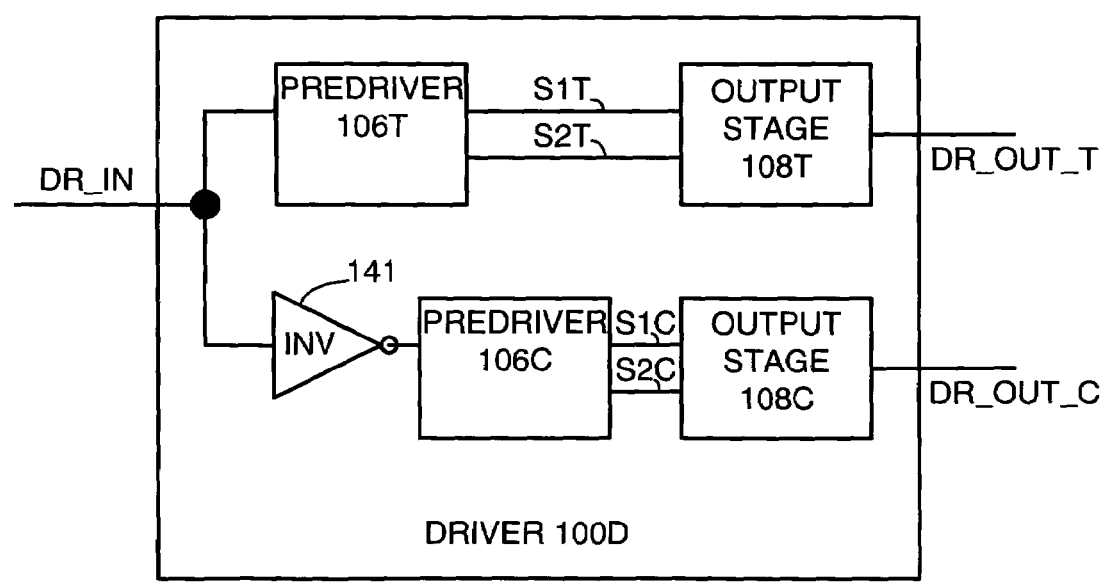
FIG. 7 shows an expanded view of the precompensated driver of FIG. 6.

Many high-speed signal transmissions utilize differential signaling. Differential signaling uses two signal conductors per logical signal. A first phase of the logical signal is transmitted on a first signal conductor, and a second phase of the logical signal is sent on a second signal conductor. Embodiments of the present invention readily support differential signaling, as shown in FIGS. 6 and 7. FIG. 6 shows a precompensated driver 100A coupled to an input DR_IN and driving a first phase output DR_OUT_T "true" phase of data received at DR_IN, and driving a second phase output DR_OUT_C "complement" phase of data received at DR_IN. DR_OUT_T is coupled to first signal conductor 102A which has a characteristic impedance Z0. DR_OUT_C is coupled to second signal conductor 102B which has a characteristic impedance Z0. Typically, the characteristic impedance of first signal conductor 102A and the characteristic impedance of second signal conductor 102B are designed to be equal (i.e., the same Z0), however the invention contemplates different characteristic impedances. Both signal conductors 102A, 102B, also have signal conductor transfer functions, as described earlier for signal conductor 102.

FIG. 7 illustrates that precompensated driver 100A is simply two instantiations of the blocks described in precompensated driver 100, with a phase difference included in series with one of the instantiations. DR_IN is coupled to predriver 106T which provides control signals S1T, S2T controlling switches in output stage 108T in the same manner as described earlier in FIG. 3A. DR_IN is coupled to INV 141, which is coupled to predriver 106C, which, in turn, provides signals controlling switches in output stage 108C, again as explained with similar elements in FIG. 3A. Output stage 108T and output stage 108C therefore drive precompensated complementary signals at DR_OUT_T and DR_OUT_C, respectively. As with the nondifferential precompensated driver 100, no current sources are used, and therefore, output stages 108T, 108C can operate with very little voltage difference between a first supply voltage (e.g., VDD) and a second supply voltage (e.g., GND); a sufficient voltage difference ensures that the switches are "on". In particular, in an embodiment where the switches are FETs, when signals S1T, S2T, S1C, S2C have sufficiently higher uplevels than VDD to place the NFETs they control (in output stage 108T, 108C) into a linear region of operation, and sufficiently lower downlevels than GND to place the PFETs they control (in output stage 108T, 108C) into a linear region of operation, precompensated driver 100A can operate at extremely low voltage (between VDD and GND), for example 0.1 volt. Even if signals S1T, S2T, S1C, S2C are driven from GND to VDD, precompensated driver operates at a VDD-GND difference of only slightly more than one VT, e.g., VT+0.1 volt.

Figure 8:
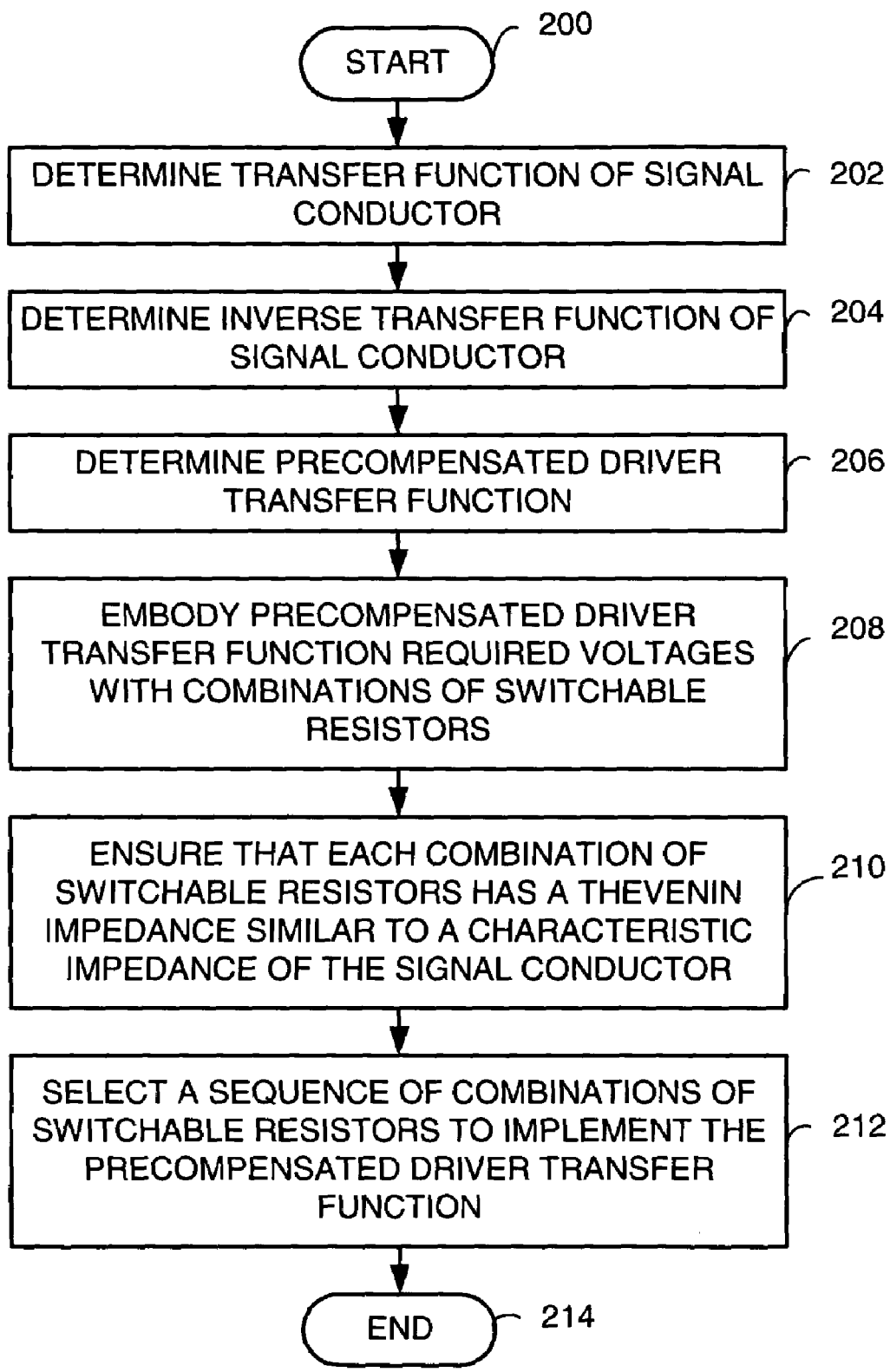
FIG. 8 is a flow chart of a method embodiment of the present invention.

Embodiments of the present invention can be expressed as methods. FIG. 8 is a flow chart of a method embodiment of the present invention. The method begins with step 200. In step 202, the transfer function of a particular signal conductor, or transmission line, is determined, as described earlier, resulting in signal conductor transfer function $H_{sc}$. The designer wishes to determine a precompensated driver transfer function $H_{df}$ such that the overall transfer function, $H_{overall}$ of the precompensated driver and the signal conductor is "1". $H_{overall}=H_{sc}H_{df}$. If $H_{df}=1/H_{sc}$ the overall response is "1", i.e., undistorted. In step 204, the inverse transfer function of the signal conductor is found, simply the inverse of $H_{sc}$. In step 206, a suitable precompensated driver transform is determined. Ideally, the transform would consider all prior data sent by the precompensated driver on the transmission line. In practice, only a short history of prior data is considered. For example, in FIG. 1B, five distinct voltage levels are shown. Typically, a history of one to three prior bits of data transmission are considered, however the present invention contemplates any number of prior bits of data transmission.

In step 208, a number of combinations of switchable resistors are established such that for each particular Thevenized voltage required by the precompensated driver transfer function, the resistors can be connected to voltage supplies by switches in selected combinations in such a way as to embody the particular Thevenized voltage.

In step 210, each selectable combination of resistors is designed to have a predetermined Thevenin impedance suitable to match the impedance of a particular signal conductor that will be driven by precompensated driver 100.

In step 212, a sequence of combinations of resistors is selected, considering one or more bits of prior data sent by the precompensated driver, to implement the precompensated driver transfer function.

Step 214 ends the method.

What is claimed is:

1. A pre-emphasis driver comprising:
   a driver input to receive data to transmit; and
   a driver output to transmit data over a signal conductor, the signal conductor having signal conductor transfer function that includes a frequency response and an attenuation;
   wherein the pre-emphasis driver implements a pre-emphasis transfer function without the use of a current source, the pre-emphasis transfer function configured to equalize the signal conductor transfer function; and
   the pre-emphasis driver further comprising an output stage configured to drive more than one uplevel voltage and more than one downlevel voltage, the output stage configured to provide a substantially constant output impedance at all of the uplevel voltages and at all of the downlevel voltages.

2. The pre-emphasis driver of claim 1, the output stage further comprising:
   a plurality of switches;
   a plurality of pullup resistors, each pullup resistor coupled to a first supply voltage through an instance of a switch in the plurality of switches; and
   a plurality of pulldown resistors, each pulldown resistor coupled to a second supply voltage through an instance of a switch in the plurality of switches.

3. The pre-emphasis driver of claim 2, further comprising a predriver coupled to the driver input, the predriver producing a plurality of control signals coupled to the plurality of switches.

4. The pre-emphasis driver of claim 3, wherein the plurality of control signals control the plurality of switches to maintain the substantially constant output impedance.

5. The pre-emphasis driver of claim 4, where the pre-emphasis driver is operational down to a voltage difference between the first supply voltage and the second supply voltage of 0.1 volt.

6. The pre-emphasis driver of claim 4, the switches being field effect transistors, and where a voltage difference between the first supply voltage and the second supply voltage is 100 millivolts or more greater than a threshold voltage of the field effect transistors.

7. The pre-emphasis driver of claim 4, the switches being field effect transistors, and the plurality of control signals having an uplevel voltage greater than the first supply voltage and a downlevel voltage less than the second supply voltage, wherein the pre-emphasis driver is operational down to a difference between the first voltage supply and the second voltage supply of 0.1 volts.

8. The pre-emphasis driver of claim 4, the predriver configured to drive the plurality of control signals such that:
a first uplevel voltage is produced by selecting a first combination of resistors including one or more resistors in the plurality of pullup resistors and one or more resistors in the plurality of pulldown resistors, a first Thevenized impedance, as seen at the driver output, of the first combination of resistors providing the substantially constant output impedance; and
a second uplevel voltage, different from the first uplevel voltage, is produced by selecting a second combination of resistors including one or more resistors in the plurality of pullup resistors and zero or more resistors in the plurality of pulldown resistors, a second Thevenized impedance, as seen at the driver output, of the second combination of resistors providing the substantially constant output impedance.

9. The pre-emphasis driver of claim 3, wherein the plurality of control signals control the plurality of switches to effect the pre-emphasis transfer function.

10. The pre-emphasis driver of claim 9, the pre-emphasis driver being operational down to a voltage difference between the first supply voltage and the second supply voltage of 0.1 volts.

11. The pre-emphasis driver of claim 9, where the switches are field effect transistors and where a voltage difference between the first supply voltage and the second supply voltage is between a threshold voltage of the field effect transistor plus 100 millivolts and two threshold voltages.

12. The pre-emphasis driver of claim 9, the plurality of control signals having an uplevel greater than the first supply voltage and a downlevel lower than the second supply voltage, and the difference between the first supply voltage and the second supply voltage is 0.1 volts or greater.

13. The pre-emphasis driver of claim 3, wherein the predriver further comprises a delay element that is utilized to determine timing of a particular control signal in the plurality of control signals.

14. The pre-emphasis driver of claim 3, further comprising:
one or more stages of a shift register; and
a clock signal coupled to the one or more stages of the shift register;
wherein the clock frequency is utilized to determine timing of one or more particular control signals in the plurality of control signals.

15. The pre-emphasis driver of claim 1, the driver output further comprising:
a first differential phase; and
a second differential phase.

16. A method of driving a pre-emphasis signal from a pre-emphasis driver onto a signal conductor, the signal conductor having a characteristic impedance and a signal conductor transfer function that includes attenuation, comprising the steps of:
determining a pre-emphasis driver transfer function suitable for equalizing the signal conductor transfer function providing a plurality of switchable resistors having selectable combinations thereof which produce a Thevenized voltage for each of two or more required uplevel voltages and for each of two or more required downlevel voltages in the pre-emphasis driver transfer function, and a Thevenized output impedance at each selectable combination that is substantially the same as the characteristic impedance of the signal conductor; and
selecting a sequence of combinations in the selectable combinations based on a present logical value to be driven on the signal conductor and one or more prior logical values driven on the signal conductor to implement the pre-emphasis driver transfer function.

17. The method of claim 16, the step of determining a pre-emphasis driver transfer function further comprising the steps of:
determining the inverse of the signal conductor transfer function; and
making the pre-emphasis driver transfer function substantially equal the inverse of the signal conductor transfer function.

18. The method of claim 16, further comprising the steps of:
using a P-channel field effect transistor (PFET) as a switch for a switchable resistor used to pull an output of the pre-emphasis driver more positive;
using an N-channel field effect transistor (NFET) as a switch for a switchable resistor used to pull an output of the pre-emphasis driver more negative;
coupling a source of the PFET to a first supply voltage;
coupling a source of the NFET to a second supply voltage; and
operating the pre-emphasis driver with a voltage difference between the first supply voltage and the second supply voltage less than two threshold voltages of the PFET or of the NFET.

19. The method of claim 16, further comprising the step of operating the pre-emphasis driver with the voltage difference between the first supply voltage and the second supply voltage less than the threshold voltage of the PFET or of the NFET.

20. The method of claim 16, the step of selecting a sequence of combinations further comprising the step of selecting at least one combination in the selectable combinations that includes at least one resistor coupled between a driver output and a first supply voltage and at least one resistor coupled between the driver output and a second supply voltage.

* * * * *